May 3, 1932.  J. M. TIPPEY  1,856,200
INSECT TRAP
Filed July 1, 1931

Jesse M. Tippey,
INVENTOR.

BY J. Stanley Burch
ATTORNEY.

Patented May 3, 1932

1,856,200

UNITED STATES PATENT OFFICE

JESSE MERRITT TIPPEY, OF ST. PETERSBURG, FLORIDA

INSECT TRAP

Application filed July 1, 1931. Serial No. 548,188.

The present invention aims to provide an insect trap constructed to supply ants and other small insects with poison, and thereby exterminate the same.

One of the chief characteristics of the present invention resides in the provision of a trap of the above-mentioned character, wherein the poison is readily accessible to the insects, but fully protected from access of children and domestic pets, such as birds, dogs, cats, etc.

Another important object of the invention resides in the provision of a trap of the class in question, including a sectional container of small and neat appearance, and wherein one section of the container forms a permanent part of the trap, and serves in the capacity of a protecting hood therefor, when the trap is in use.

Other objects and advantages of the invention will appear when the following detail description is read in connection with the accompanying drawings, the invention residing in the construction, combination and arrangement of parts as claimed.

In the drawings forming part of this application like numerals of reference indicate similar parts in the several views and wherein.

Figure 2:
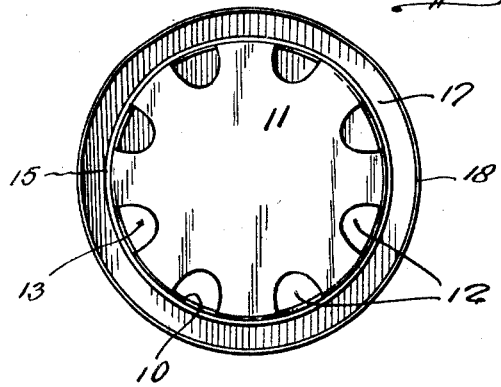
Figure 2 is a bottom plan view of the trap proper.
Figure 3:
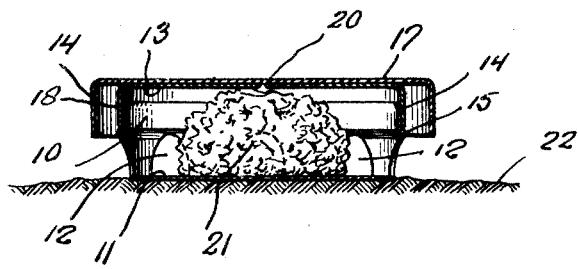
Figure 3 is a sectional view through Figure 2 and illustrating how the trap is used.

The trap forming the subject matter of the present invention, comprises a receptacle 10 open at its upper end, and including a bottom 11. The receptacle may be constructed from any suitable material, preferably light metal, and may also vary in size and configuration without departing from the inventive idea. The receptacle however is preferably of cylindrical contour, and is provided with an annular series of openings 12 which are located at the juncture between the bottom and wall of the receptacle. In other words, each opening 12 extends partly along the wall of the receptacle and partly across the bottom 11 as illustrated in Figure 2, so that ants and other small insects will experience no difficulty in gaining access to the poisonous substance adapted to be contained within the receptacle, when the latter is set in an ant's hill, or directly upon the floor or other surface in the path of the insect. The openings 12 are so constructed and located, that they are in close proximity to the floor or surface upon which the trap is supported, as shown in Figure 3, and as will be obvious, the insects enter these openings to obtain the poisonous substance, and are thereby exterminated. The receptacle 10 is provided with a flanged cover 13, the flange 14 of which bears against the rib or bead 15 formed on the wall of the receptacle as clearly illustrated in Figure 3.

Figure 1:
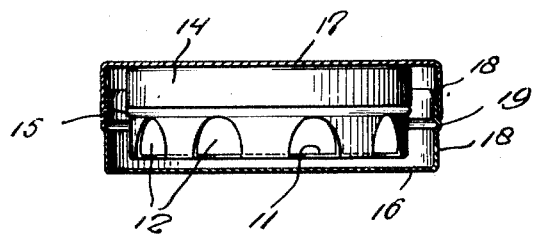
Figure 1 is a sectional view through the trap arranged within its container.

In accordance with the present invention, I provide the trap with a sectional container, in which the trap proper can be stored when not in use, and also handled for sale, the entire article being very small and neat in appearance. The companion sections of the container are indicated at 16 and 17 respectively, each being formed with a flange 18, the flange of the section 17 reposing upon a bead 19 formed on the flange of the section 16 as clearly shown in Figure 1. The diameters of these sections are considerably greater than the diameter of the receptacle and its cover, so that the section 17 of the container can be used in the capacity of a protecting hood for the trap when the latter is in use. For this purpose, the section 17 is permanently attached to the cover 13 of the receptacle in any suitable manner, preferably by being soldered thereto as indicated at 20 in Figure 3. When used in this capacity, the section 17 has its flange 18 arranged in spaced concentric relation about the flange 14 of the cover 13, and extends an appreciable distance below the latter to protect the trap and its contents from the element when the trap is used out-doors. Furthermore, the flange 18 of this protecting hood is arranged in close proximity to the floor or surface, so that access to the poisonous contents of the receptacle cannot be very easily obtained by domestic pets, such as birds, dogs, cats and the like, and by virtue of which construction the poisonous contents of the trap are also protected from small children.

The article in its entirety includes an element of absorbent material, such as a sponge or the like indicated at 21 and which is adapted to be saturated with a poisonous substance. The article is sold in the condition illustrated in Figure 1, wherein the trap is arranged within its container, and by reason of the fact that one section of this container forms a permanent part of the trap, it is manifest that the latter can be very easily and conveniently set up for use. For this purpose it is only necessary to remove the lowermost section 16 of the container, and subsequently arrange the trap at the desired location, the trap being supported by the bottom 11 thereof. As hereinabove stated when arranged in this manner, the openings 12 are arranged very close to the floor or supporting surface 22, with the flange 18 of the protecting hood arranged in spaced concentric relation about the body of the trap as shown in Figure 3. Ants and other small insects are thereby allowed to enter the openings 12 and feed upon the poisonous substance contained by the sponge 21, while this substance is at the same time protected from children and domestic animals such as birds, dogs, cats, etc.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as new is:

1. An insect trap of the character described including a receptacle to receive an absorbent element saturated with poison, a cover for the receptacle, said receptacle having openings adjacent the lower edge thereof, and a protecting hood carried by said cover and including a depending flange in spaced concentric relation about the body of the receptacle.

2. An insect trap of the character described including a receptacle to receive an absorbent element saturated with poison, a flanged cover for the receptacle, said receptacle having openings at the lower edge thereof, partly extending along the walls of the receptacle and also along the bottom thereof, and a protecting hood carried by said cover and including a depending flange arranged in spaced concentric relation to the flange of the cover and extending beneath the lower edge thereof for the purpose specified.

3. An insect trap of the character described, including a receptacle to contain an absorbent element saturated with poison, and having openings about the lower edge thereof, a cover therefor, and a sectional container for said trap, one of said sections being permanently attached to said cover and having a depending flange arranged in spaced concentric relation about the body of the trap for the purpose specified.

4. An insect trap of the character described, including a receptacle to contain an absorbent element saturated with poison, and having openings about the lower edge thereof, a cover for the receptacle, a sectional container for the trap, one of said sections being permanently attached to said cover and having a depending flange arranged in spaced concentric relation about the body of the trap, and the other of said sections being removable, and including a flange normally received by the flange of the first-mentioned section and frictionally held associated therewith.

In testimony whereof I affix my signature.

JESSE MERRITT TIPPEY.